March 5, 1935.  R. D. SMITH  1,993,387
MEANS FOR OPERATING UPON THE CHASSIS OF MOTOR VEHICLES
Filed April 12, 1934  4 Sheets-Sheet 1
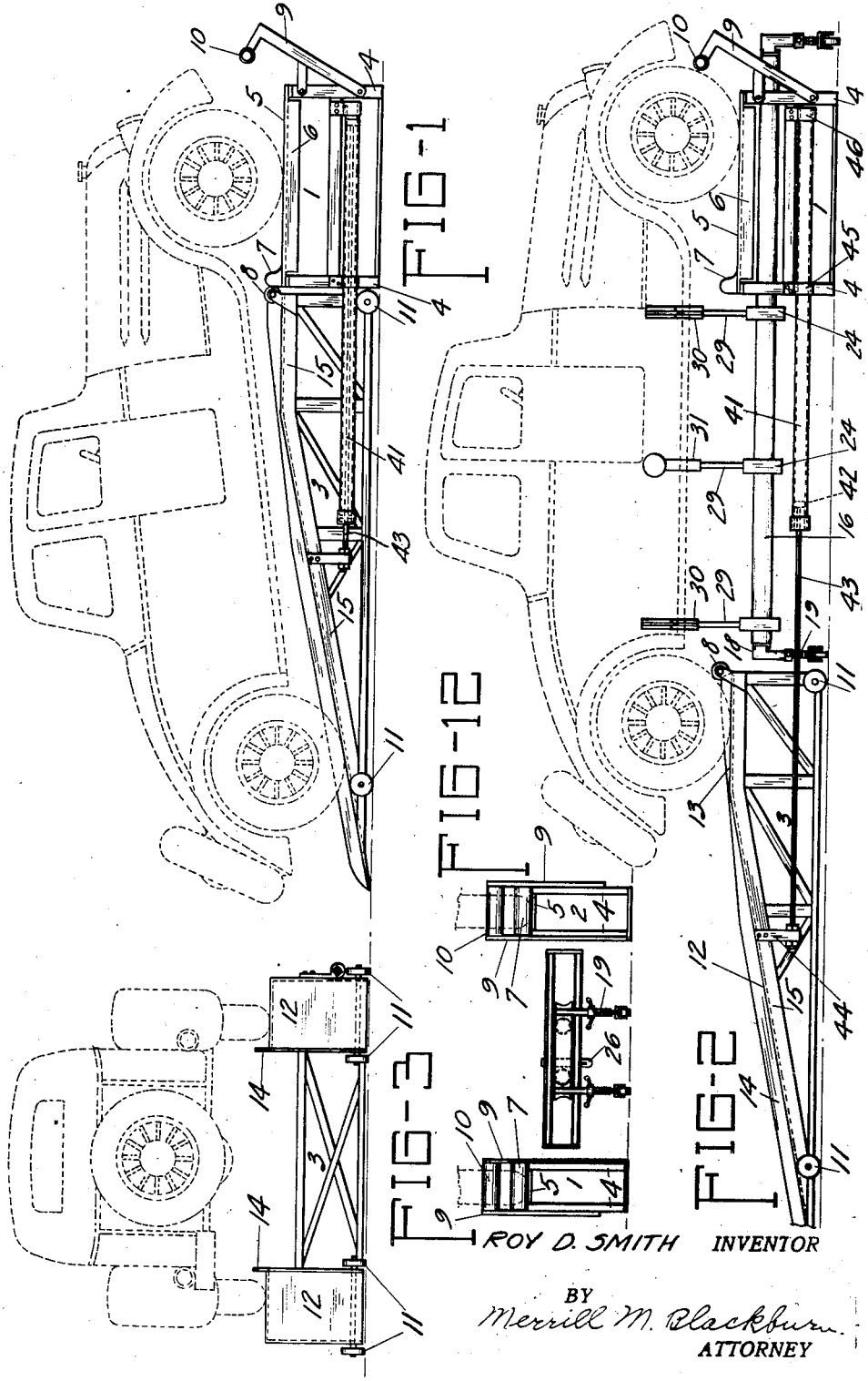
ROY D. SMITH INVENTOR
BY Merrill M. Blackburn
ATTORNEY

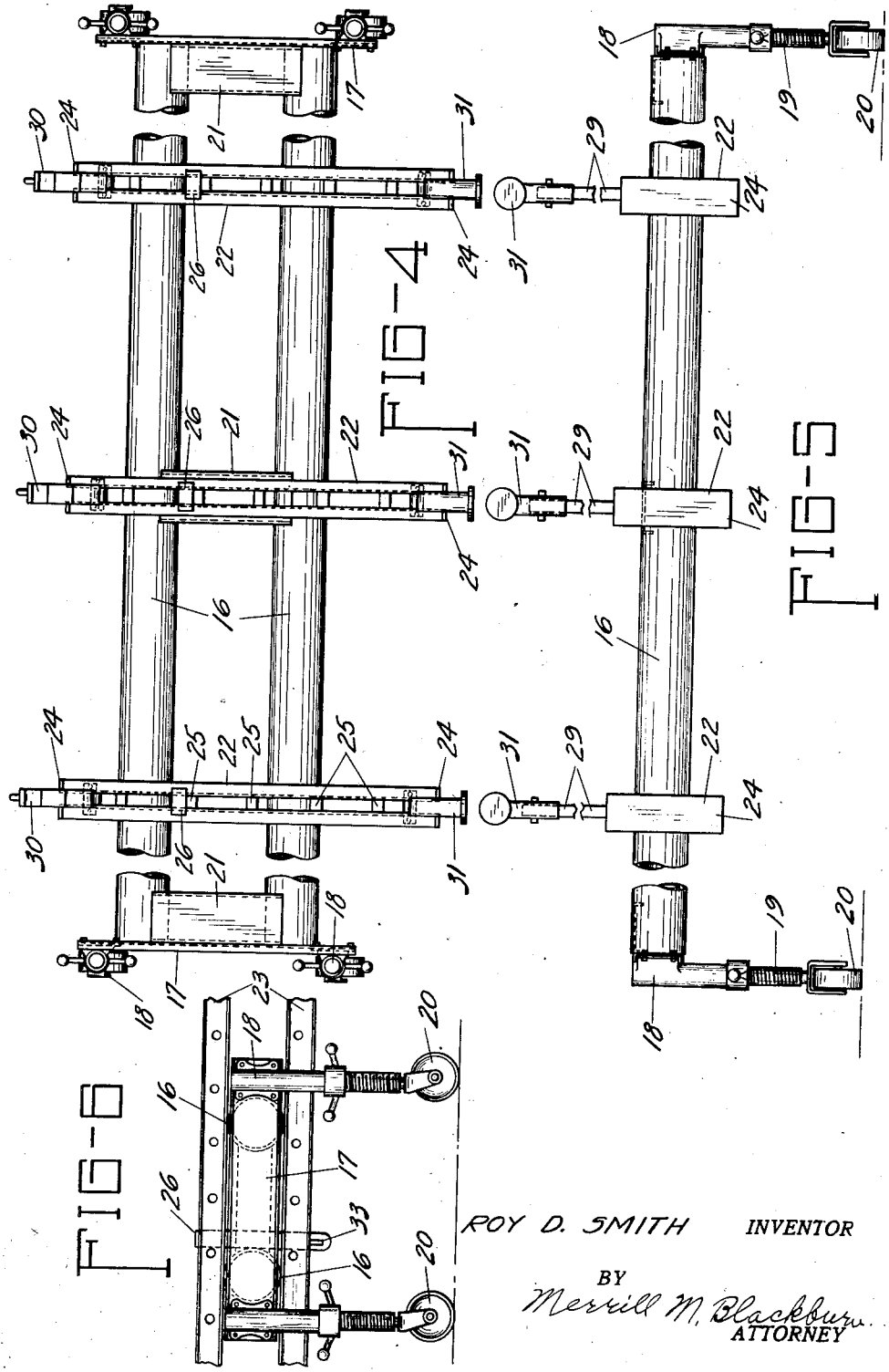

March 5, 1935.  R. D. SMITH  1,993,387
MEANS FOR OPERATING UPON THE CHASSIS OF MOTOR VEHICLES
Filed April 12, 1934  4 Sheets-Sheet 3
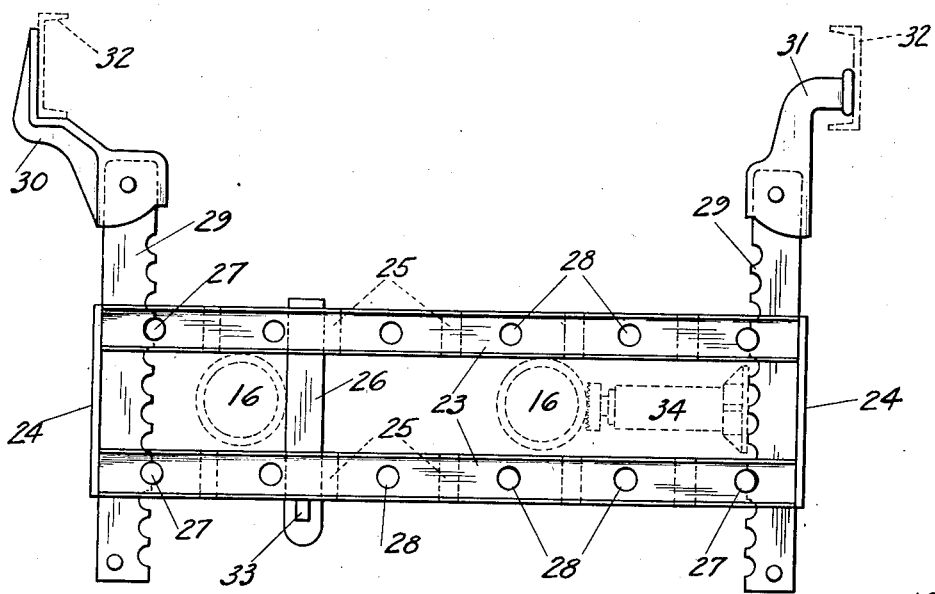
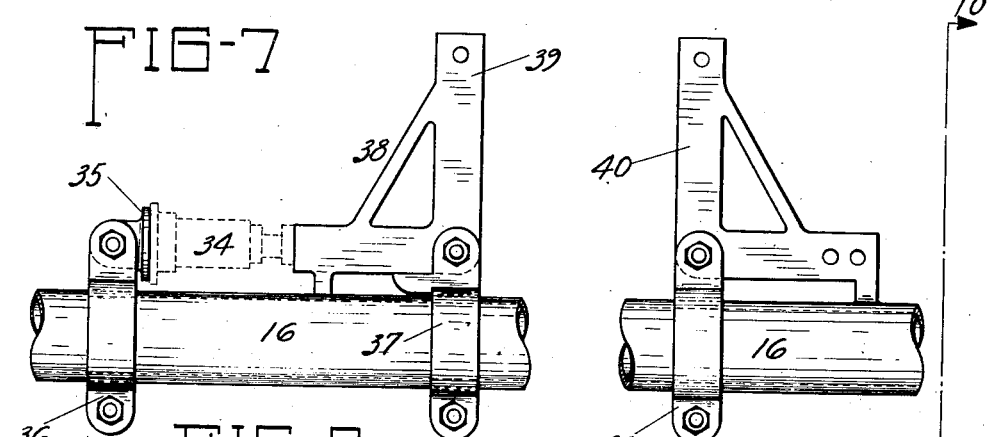
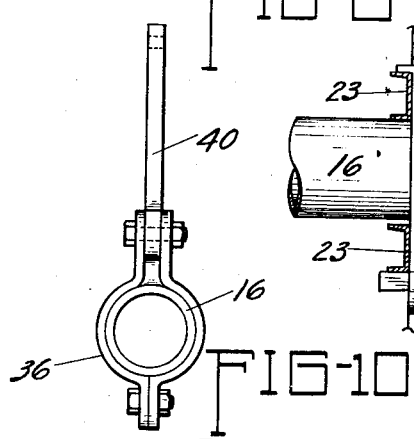
ROY D. SMITH INVENTOR
BY
Merrill M. Blackburn
ATTORNEY

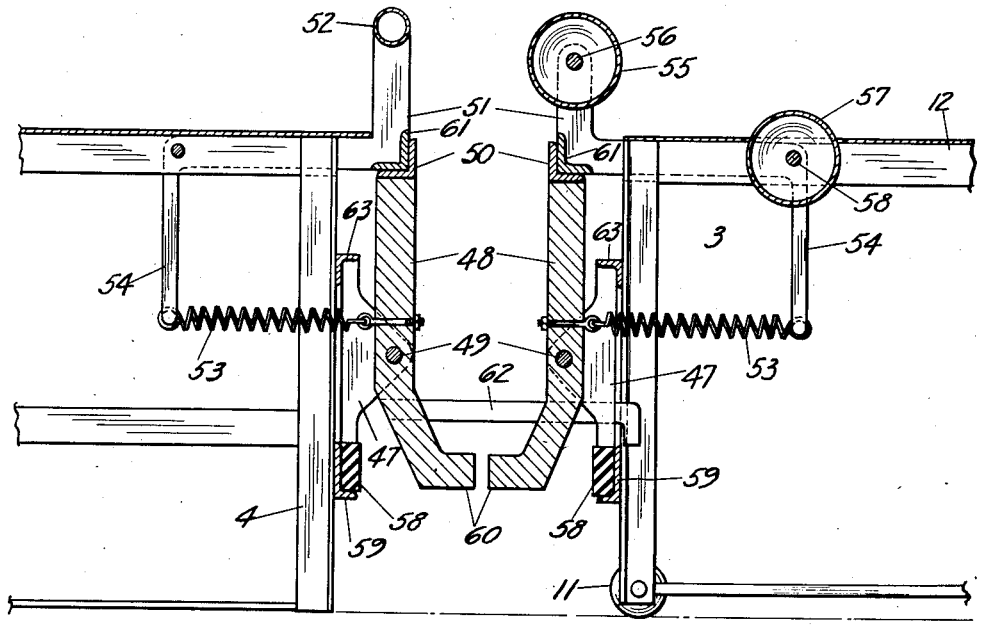
FIG-13
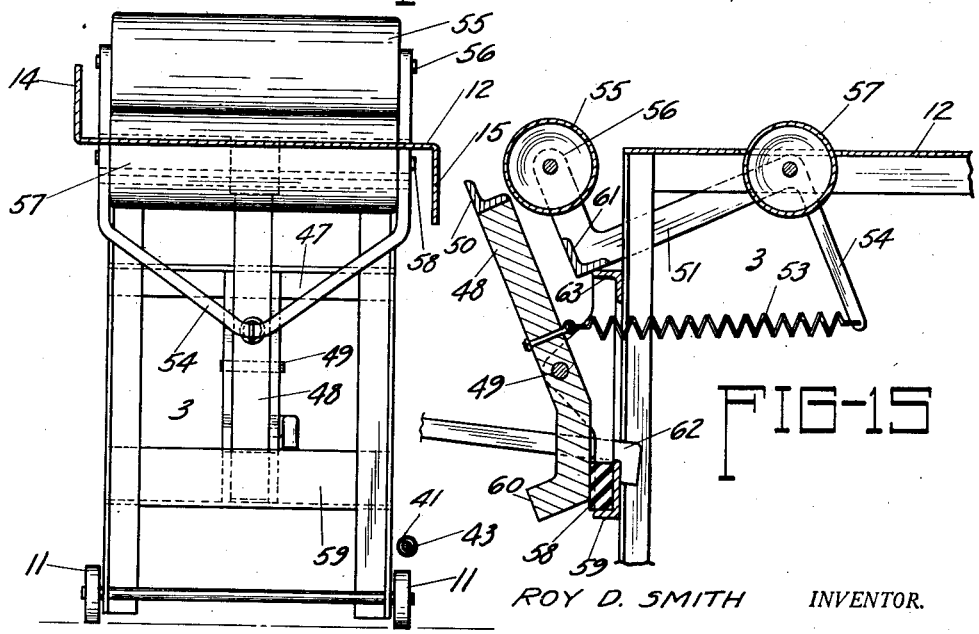
FIG-14
FIG-15
ROY D. SMITH INVENTOR.
BY Merrill M. Blackburn
ATTORNEY Patented Mar. 5, 1935

1,993,387

UNITED STATES PATENT OFFICE 1,993,387

MEANS FOR OPERATING UPON THE CHASSIS OF MOTOR VEHICLES

Roy D. Smith, Davenport, Iowa, assignor to Bee Line Manufacturing Company, Davenport, Iowa, a corporation of Iowa Application April 12, 1934, Serial No. 720,233

19 Claims. (Cl. 153—32)

The present invention relates to apparatus adapted for use more particularly in garages and is especially intended for use in straightening frames and axles and in rectifying the shape of motor vehicle frames when, for one reason or another, they do not have the proper shape. Among the objects of this invention are to provide a lighter machine for the purpose indicated than those heretofore built for this purpose; to provide a machine of the character indicated which can be produced and sold at a lower price than those heretofore built; to provide a machine of the character indicated which is simple to operate; to provide a machine of the character indicated which will, when not in use, occupy a minimum of space but which, when in use, will accommodate a vehicle of minimum or maximum length; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Fig. 1 is a side elevation of that part of my new machine on which the motor vehicle is placed to be operated upon;

Fig. 2 is a view similar to Fig. 1 with a vehicle completely mounted upon the machine and with a part of the frame-straightening apparatus in place under the motor vehicle;

Fig. 3 is a rear end view of the structure shown in Fig. 2;

Fig. 4 is a plan view and Fig. 5 a side elevation of the apparatus for operating upon the motor vehicle frame;

Fig. 6 is an end elevation of the structure shown in Figs. 4 and 5 with parts broken away;

Fig. 7 is an elevation on a slightly larger scale of a part of the apparatus shown in Figs. 4 and 5;

Figs. 8 and 9 are side elevations of parts of the apparatus;

Fig. 10 is an end elevation of the structure shown in Fig. 9, the same being indicated by the line 10—10, Fig. 9, as being taken in the direction of the arrowheads;

Fig. 11 is a transverse section across the structure shown in Fig. 7, taken between the two pipes shown by the dotted circles in this figure;

Fig. 12 is a front end elevation of the structure shown in Fig. 2 with parts omitted;

Figs. 13, 14 and 15 are detail views of means for securing together and releasing the fixed and movable parts of the automobile stands.

The apparatus of the present invention comprises two principal units, each of which is composed of various elements. The first of these comprises fixed stands 1 and 2 and the movable stand 3. The legs 4 of the fixed stands 1 and 2 are connected by plates which are secured to the floor and thus keep the stands from moving. The tops 5 of the fixed stands are formed from channels turned upside down so that the web of the channel is reenforced by the flanges 6 thereof. A rib 7 extending across the rear end of the stand top causes the front wheels to be raised up when the vehicle is being backed off from the stand. This insures that the wheels will pass to the top of the roller 8 forming a part of the movable stand 3. It will be understood that there are two of these, one for each side of the vehicle. Brackets 9 are secured to the front legs 4 of the forward or fixed stands 1 and 2 and carry at their upper ends bumpers 10 which serve as stops to prevent the vehicle from being driven too far. When the forward wheels of the vehicle strike against the bumpers 10, the vehicle is stopped and will travel no farther, although the rear wheels may continue to rotate, thus moving the movable stand 3 rearwardly on its wheels 11. This may continue until the rear wheels of the vehicle contact the freely rotatable rollers 8. When this happens, the vehicle wheels will be lifted sufficiently from the top of the stand so that there will be no further tendency to cause rearward movement of the stand. The vehicle and stands will then be in the positions shown in Fig. 2.

The movable stand 3 comprises a framework supported on wheels 11 and having ramps 12 and tops 13. Each ramp 12 has an upstanding flange 14 to prevent the vehicle from running off the inside edge of the ramp and stand, and this flange also furnishes stiffening for the ramp. Stiffening for the outer edge of the ramp is furnished by a downwardly extending flange 15, shown in Figs. 1 and 2.

The unit which carries the frame-straightening abutments is illustrated more particularly in Figs. 4, 5 and 6. This comprises a pair of iron pipes 16 secured together at their ends by crossmembers 17 to which are secured casings 18, which serve as receptacles for the shanks 19 carrying at their lower ends the wheels 20 which serve as castering supports for this frame. Crossties 21 also serve to secure the pipes 16 rigidly together so that the frame will be thoroughly rigid when under strains during use.

A plurality of frames 22 are mounted on the pipes 16 and include the channel members 23 connected at their ends by the cross-members 24. These frames are freely slidable on the pipes 16 so that they may be adjusted to any desired positions longitudinally of these pipes. The channels 23 are connected together in spaced-apart relation, as indicated at 25, the connectors 25 serving as abutments for the keys 26. One or more cross-pins 27 may be inserted into the openings 28 to hold the brackets or knees 29 in vertically adjusted position. It will be noticed that these are notched along one edge to receive the pins 27. The heads 30 and 31 of the brackets 29 are shaped, respectively, to engage the outer and inner faces of the frame members 32 of the vehicle. The keys 26 may be held in place by means of tapered cross keys 33, as shown in Figs. 7 and 11.

When it is desired to make a transverse bend in the vehicle frame, either the brackets 30 and 31 of the middle frame 22, as shown in Fig. 4, are interchanged and reversed, or those of the two end frames, as shown in this figure, have their positions changed as indicated. What is done will depend upon the direction which it is desired to bend the frame. The positions of the pipes 16 and jack 34 are indicated in Fig. 7 by means of dotted lines. These are the positions occupied during transverse bending of the frame.

Sometimes a vehicle frame is distorted by having one frame member farther forward than the other. This is known as a diamond frame and is generally the result of an accident. In order to rectify this condition, the frame is "pulled", which means that the opposite sides are pulled in opposite directions. The equipment for doing this work with the present apparatus is shown in Figs. 8 and 9. In Fig. 8, an abutment 35 is shown as clamped to one of the pipes 16 by means of the clamp 36 which grips the pipe 16 tightly enough to be immovable during use. A clamp 37 surrounds the pipe 16 and is mounted thereon loosely enough so that it can slide under the influence of the jack 34. A bracket 38 is carried pivotally by the clamp 37 and has an end 39 projecting upwardly far enough to engage a part of the automobile frame so as to transmit pressure thereto when the jack is actuated to force the bracket 38 and clamp 37 along the pipe. On the other pipe 16 there is a clamp 36 which tightly grips the pipe and holds a bracket 40 against longitudinal movement with relation to the pipe. As indicated above, this apparatus is used in pulling diamond frames so as to make them rectangular. The ends of the brackets are provided with holes by means of which chains or other suitable force transmitting means can be attached thereto so as to connect the brackets to a part of the automobile frame. It will of course be understood that these brackets may be made long enough to reach up and engage a part of the frame underneath the vehicle, if so desired. These holes in the brackets can also be used, if desired, in fastening the frame to the pipe 16, in event a vertical bend in the frame should be required.

When the work on the motor vehicle has been completed, the apparatus is completely disconnected therefrom, the vehicle engine started, and the car backed up. When the front wheels strike the projections 7, they stop, but the rear wheels keep turning and drawing the movable stand 3 forward until its forward end engages the rearward end of the fixed stands 1 and 2. Further operation of the vehicle in reverse causes the front wheels to ride up over the projections 7 and rollers 8 and then down the ramps 12.

The foregoing description sets forth this invention in its simplest form but, in its preferred form, it comprises, also, a check to retard the movement of the movable section 3 and securing means shown on sheet 4 of the drawings to secure the fixed and movable sections together so that there can be no chance of their separation before the front wheels of the motor vehicle reach their position on the fixed stands 1 and 2. The check comprises a tube 41 having a piston 42 therein which is carried by a rod 43, secured by a bracket 44 near the mid-length of the movable stand 3. The pipe 41 is held in place on the fixed stand 1 by means of similar brackets 45 and 46. If considered desirable, a similar check may be mounted upon the opposite side of the machine but this is regarded as ordinarily unnecessary. A clearance of approximately one-eighth of an inch between the piston 42 and the inside of the pipe 41 permits a restricted flow of oil from one side to the other of the piston 42 while the movable stand 3 is moving forward or backward. This results in reducing the rate of travel of the movable stand to a point such that there will be no danger whatsoever of the rear wheels running off the forward end of the movable stand. Also, the feeling which one has in operating his vehicle is more nearly that of the normal operation of the same. Furthermore, the clash of the movable element against the fixed stand, when removing the vehicle therefrom, is reduced to a minimum.

Reference will now be made particularly to sheet 4 showing structure which takes the place of the parts 7 and 8, shown in Figs 1 and 2. It will be understood that the construction shown in Figs. 13, 14 and 15 may be used or not, as desired, but that the operation of the apparatus will be much improved by the use thereof. In this construction, supports 47 are secured to the ends of the fixed and movable stands and have levers 48 pivotally mounted thereon, as shown at 49. These levers have angles 50 at their upper ends to serve as supports for crank members 51. The cranks on the fixed stands 1 and 2 have cross-bars at their upper ends to prevent the forward wheels of the vehicle from leaving these stands before the rear stand 3 has been brought up to place so that the vehicle, when leaving the forward stand, may pass directly to the rearward stand. A spring 53 is connected to the arm 54 of the crank or lever 51 and has connection with some other part, such as the lever 48, so that tension may be placed upon the spring so that the lever 51 will be raised into the position shown in Fig. 13. A roller 55 is pivotally mounted on the shaft 56 carried in the upper end of the lever 51 of the movable unit, while a roller 57 is similarly mounted on the shaft 58 which forms a pivot for this lever. The two rollers 55 and 57 serve as means for preventing the rear wheels of the motor vehicle from running off the forward end of the movable unit 3. This will be readily understood from Fig. 13 of the drawings.

Resilient bumpers 58 are carried on crossangles 59 and are so positioned as to be engaged by the lower ends of the levers 48 when they are turned about their pivots 49. It will be seen from Figs. 13 and 15 that when the ends 60 are brought into engagement, the levers 48 are turned about their pivots 49 and the angles 50 are swung out from below the cross-angles 61, so as to release the levers 51 and permit depression of the cross-bar 52 and roller 55. This will permit easy transit of the front vehicle wheels from the stands 1 and 2 to the stand 3. At this time, when the levers 48 are turned about their pivots 49, as indicated in Fig. 15, the hook 62 is caused to engage a cross-angle 59 so as to prevent accidental separation of the stand 3 from the stands 1 and 2. It will be apparent from Fig. 15 that the cross-angles 61 engage the upper portions of the brackets 47, indicated at 63, thus limiting the downward motion of the levers 51.

It is of course understood that the specific description of structure set forth above may be departed from without departing from the spirit of my invention as set forth in this specification and the appended claims. It is intended to claim, both broadly and specifically, the various novel features of this invention disclosed herein, and I therefore desire that failure to insert any claim commensurate with the scope of my invention be not construed as an abandoment thereof.

Having now described my invention, I claim:

1. Apparatus for the purpose indicated comprising a pair or normally fixed stands for the support of the front wheels of a motor vehicle, and movable supporting means for the rear wheels of the vehicle, said movable supporting means comprising a pair of ramps serving as runways for the vehicle in getting to its position upon the stands, said movable supporting means, when not in use, normally resting close to the fixed stands and being actuated away from same by the vehicle as it takes its place on the stands and supporting means, in combination with means between the stands serving to hold means whereby a motor vehicle upon the apparatus may be operated upon.

2. A structure as defined by claim 1 having means to prevent the wheels of the vehicle from leaving the stands and the movable supporting means.

3. A structure for the purpose indicated comprising a pair of disconnected fixed stands to support the front wheels and forward portion of a motor vehicle, movable supporting means for the rear portion of the motor vehicle, said movable supporting means having supporting wheels upon which it may be supported for movement, and means for preventing the rear wheels of the motor vehicle from inadvertently running off the forward end of said supporting means, in combination with means between the stands serving to hold means whereby a motor vehicle upon the apparatus may be operated upon.

4. In a structure for the purpose indicated, a pair of disconnected separated front end supports for supporting the front end of an automobile, said supports having at their forward ends means for preventing the vehicle wheels from inadvertently running off the said supports, and having other means for retarding the backward movement of the vehicle when the vehicle is leaving said supports, in combination with means between said supports for holding means by which a motor vehicle upon the structure may be operated upon.

5. In a structure for the purpose indicated, supporting means for the forward end of a motor vehicle and movable supporting means for the rear portion thereof, said movable supporting means comprising a pair of ramps supported on rolling means, said supporting means for the rear end of the motor vehicle having adjacent its forward portion means for preventing the rear vehicle wheels from inadvertently running off the forward end of the said movable supporting means, and means movable between the supporting means for the front wheels of the vehicle, said last mentioned movable means serving to support means for use in operating upon the chassis of the vehicle.

6. In a structure for the purpose indicated, the combination of a pair of fixed, separated supporting units for the forward end of a motor vehicle, said units being adapted to support the forward end of a vehicle in elevated position, movable supporting means for the rear end of the vehicle, said movable supporting means having rollable means upon which the movable supporting means may move under the influence of the vehicle, and means insertable between the fixed supporting means and underneath the vehicle for supporting underneath the vehicle means for operating upon the under portion of the vehicle.

7. A structure as defined by claim 6 in which the supporting means between the fixed supporting means is provided with wheels upon which it may be moved about from place to place.

8. A structure for the purpose indicated comprising a pair of fixed, separated supporting stands for the front wheels of a motor vehicle, said stands having adjacent their forward ends means whereby forward motion of the vehicle may be stopped and having adjacent their rearward ends means for preventing the vehicle wheels from inadvertently leaving the stands, means for supporting the rearward end of the vehicle, comprising normally substantially horizontal stands upon which the rear vehicle wheels may rest and a pair of ramps leading thereto, whereby the vehicle may move to the wheel supporting means, said horizontal supporting stands having upwardly projecting stops for preventing the rear wheels of the vehicle from inadvertently leaving the rearward wheel supporting means, and means rigidly connecting the two ramps to continuously hold them a fixed distance apart and to insure that when the ramps move they remain parallel, said rear wheel supporting means having rollable supporting means upon which it may move, in combination with means located between the front end supporting stands for supporting beneath the vehicle body means whereby force may be applied to the vehicle frame to rectify the form thereof.

9. A structure for the purpose indicated comprising means for supporting a motor vehicle at an elevation above the ground or a floor, in combination with a frame movable as a unit into the space inside of the supporting means, said frame comprising a plurality of pipes connected in spaced-apart, side-by-side relation, and means on the pipes for applying force to the frame of the vehicle supported above the apparatus.

10. A structure as defined by claim 9 in which the last named means comprises an open framework surrounding said pipes and having means movably supported therein for engaging the side frame elements of the supported vehicle.

11. A structure as defined by claim 9 in which the means on the pipes comprises a fixed abutment on each of two pipes and a movable abutment on one of them to cooperate with the fixed abutment on that pipe, the movable abutment on one pipe and the fixed abutment on the other pipe cooperating in transmitting force to the vehicle longitudinally thereof to change the form of its frame.

12. In a structure for the purpose indicated, a pair of pipes rigidly connected together and having rollable means upon which the pipes may be supported for movement from place to place, in combination with a plurality of tool-holding frames comprising pairs of channels spaced apart, vertically and horizontally, and rigidly secured together adjacent their ends to form a framework adapted to surround the pipes and to receive tools extending transversely to the pipes, said frames being movable transversely of the pipes.

13. A structure as defined by claim 12 in which the tools receivable in the frame are adjustable vertically and horizontally in the frame.

14. Apparatus for the purpose indicated comprising fixed supporting means for the support of the front wheels of a motor vehicle, and movable supporting means for the rear wheels of said vehicle, said movable supporting means comprising a pair of ramps serving as runways for the vehicle in getting to its position upon the fixed supporting means, said movable supporting means, when not in use, normally resting close to the fixed supporting means and being actuated away from same by the vehicle as it takes its place on the fixed and movable supporting means, and a portable implement support movable into the space within the confines of the fixed supporting means.

15. A structure for the purpose indicated comprising means for supporting a motor vehicle at an elevation above the ground or a floor, in combination with a frame movable as a unit into the space inside of the supporting means, said frame having a rigid body and means for supporting same spaced from the floor, and means on the body for applying force to the frame of the vehicle supported above the apparatus.

16. A structure for the purpose indicated comprising means for supporting a motor vehicle at an elevation above the ground or a floor, in combination with a frame movable as a unit into the space inside of the supporting means, said frame comprising a plurality of pipes connected in spaced-apart, side-by-side relation, and abutments on said pipes cooperating in the application of force to the frame of a vehicle standing upon the apparatus.

17. A structure as defined by claim 1 having means for normally latching the movable supporting means to the fixed stands to prevent inadvertent separation thereof.

18. A structure for the purpose indicated comprising fixed supporting means for one end of a motor vehicle, readily movable supporting means for the other end of the motor vehicle, said movable supporting means readily actuated away from or toward the fixed supporting means by the supported vehicle as same approaches or leaves the supports, and a portable implement support movable into the space within the confines of the fixed supporting means.

19. A structure as defined by claim 18 having stop means pivotally mounted upon the supporting means and serving to furnish a limiting means for movement of a vehicle toward or from its position on the supporting means, there being means to hold the limiting means in limiting position until such time as the movable supporting means approaches near enough to the fixed supporting means to cause release of the limiting means whereby it is made possible for said limiting means to be depressed so as to get out of the way of vehicle wheels moving on the supporting means.

ROY D. SMITH.